Figure 4:
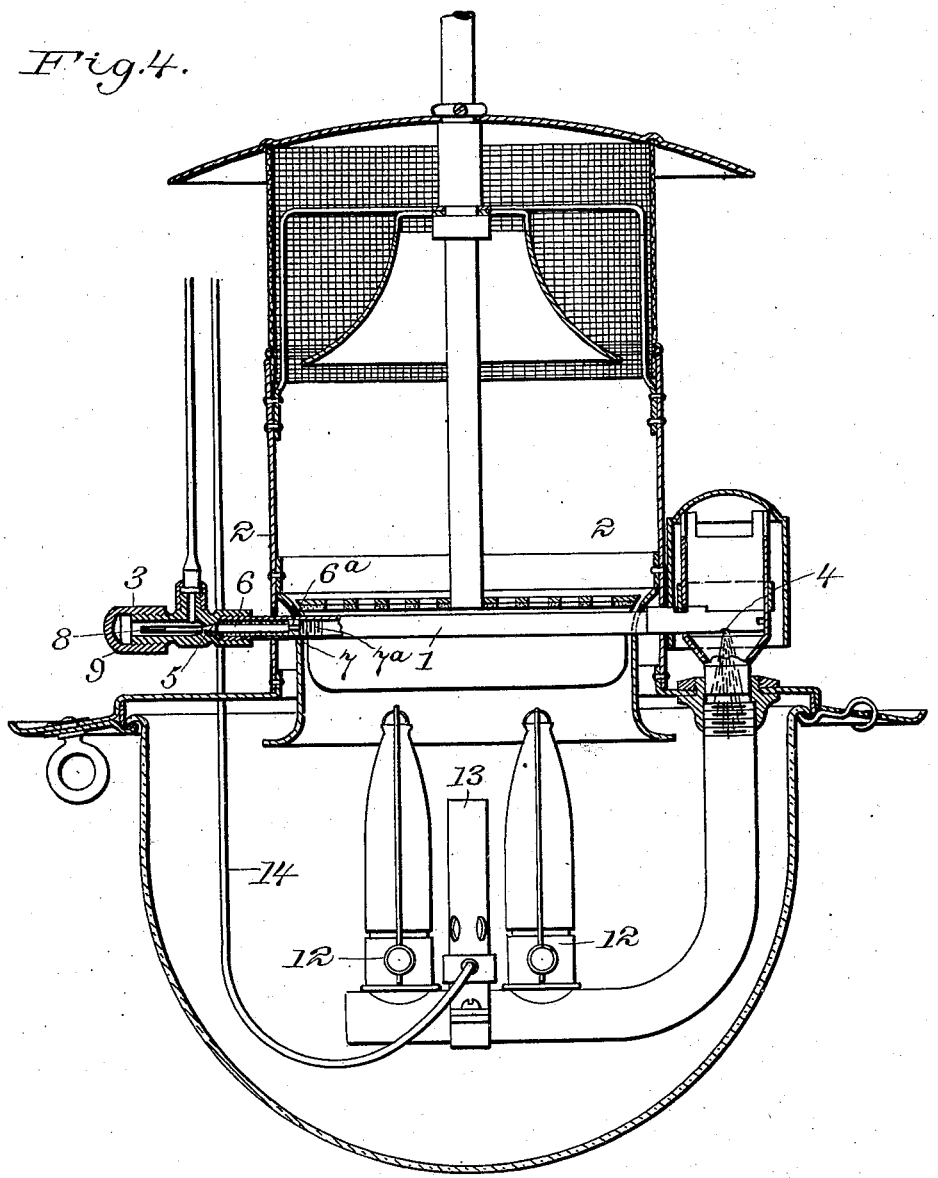

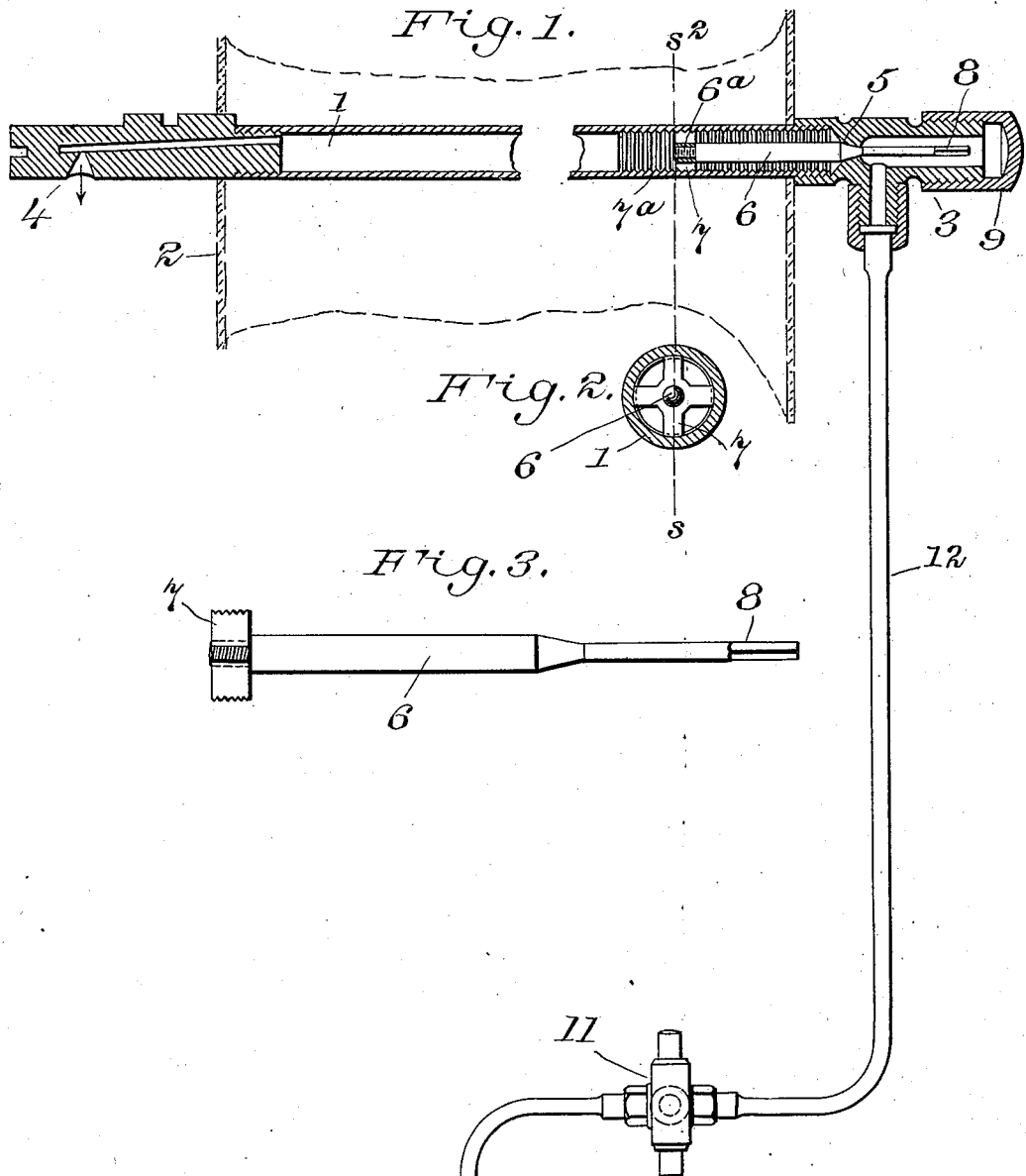

INVENTOR
ARTHUR KITSON

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

AUTOMATIC VALVE FOR VAPOR-BURNERS.

SPECIFICATION forming part of Letters Patent No. 665,114, dated January 1, 1901.

Application filed March 19, 1900. Serial No. 9,135. (No model.)

*To all whom it may concern:*

Be it known that I, ARTHUR KITSON, a subject of the Queen of Great Britain, and a resident of Philadelphia, (Germantown,) county of Philadelphia, State of Pennsylvania, have invented certain new and useful Improvements in Automatic Valves for Vapor-Burners, of which the following is a specification.

My invention relates to a vapor-burning apparatus in general; and more specifically it consists of an improved form of thermostatically-operated valve for controlling the flow of fluid hydrocarbon to the vaporizing-chamber of the apparatus. The said vaporizing-chamber most commonly occurs in the form of a vaporizing-tube stretching across the chimney over the vapor-burners, and the difficulties heretofore met with in the use of thermostatically-operated valves located in such vaporizing-tube have largely arisen from the fact that when the preheating flame is applied to the vaporizing-tube it immediately causes such an expansion of the same as will open the valve before the tube becomes hot enough to vaporize the admitted oil if the valve-actuating apparatus is composed of the same material as the vaporizing-tube. If, on the other hand, a metal expanding more rapidly than the vaporizing-tube is employed in order to compensate for the less amount of heat transmitted to it at the beginning of the operation, said second metal will become sufficiently heated during the prolonged operation of the lamp to expand to a degree which will destroy the proper adjustment of the parts. As a means of avoiding these difficulties and simplifying the construction I have discovered that by locating the entire valve-actuating apparatus in one end of the vaporizing-tube, outside of the zone of greatest heat therein, I can use the same material employed in the vaporizing-tube for such valve-actuating apparatus and at the same time avoid the premature opening of the valve or any destructive action of the parts by the full heat of the apparatus during the normal operation.

The preferred form of apparatus embodying my invention is illustrated in the accompanying sheet of drawings, in which—

Figure 1 is a central section of a vaporizing-tube with my invention applied thereto with a portion of the chimney of the vapor-burning apparatus shown in dotted lines. Fig. 2 is a cross-section on line $s^2 s^2$ of Fig. 1. Fig. 3 is an enlarged detail view of the valve-plunger and operating device; and Fig. 4 is a central sectional view of an entire lamp, showing a preheating means and its relation to a vaporizing-tube containing my improved automatic valve, the view being from the opposite side of Fig. 1.

Throughout the drawings like reference-figures indicate like parts.

The vaporizing-tube 1 is of any convenient construction and is preferably made of iron or steel. It stretches across the chimney 2 of the lamp or other vapor-burning apparatus and is subjected to the heat of the vapor-burners. The oil-supply is delivered at one end 3 of the tube and the vapor is discharged from the other end 4 in the well-known manner. The inlet end of the tube is provided with a valve-seat 5, with which the valve-plunger 6, made of the same material as the vaporizing-tube, coöperates. The other end of this plunger is fastened in a support, preferably in the form of a spider 7, which is located in the interior of the vaporizing-tube near the valve-seat, so that no part of the valve-actuating apparatus extends into the middle portion of the vaporizing-tube. The support or spider 7 may be fastened in the tube in any convenient manner, as by screwing it into the internally-threaded portion $7^a$, as shown. The plunger may also be adjustably mounted in the spider 7, as by means of the screw-threaded connection $6^a$, as shown. The plunger may also be extended through the valve-seat and have a reduced extension provided with a polygonal cross-section, as shown at 8, for the purpose of rotating the plunger and adjusting it in the support 7. The vaporizing-tube may have a removable cap 9 screwed onto its end and removable therefrom for the purpose of giving access to the end 8 of the valve-plunger when it is desired to adjust the same.

The fluid hydrocarbon is supposed to be supplied under pressure from a tank 10 through a tube 12, controlled by a valve 11, which may be located on the wall of the building in any convenient position.

The mode of operation of my invention is as follows: Normally the position of the support 7 is such and the adjustment of the valve-plunger 6 therein so arranged that it is forced down upon the valve-seat 5 and closes all admission of oil to the vaporizing-tube. When the lamp is to be started into operation, a preheating of the vaporizing-tube is produced by means of a jet of gas, a flame of alcohol, or other convenient means in the well-known way. Such a construction is shown in Fig. 4, where the Bunsen gas-burner 13 is located between the vapor-burners 12 12. Gas is supplied to the Bunsen burner through the pipe 14. Of course other means of producing the preliminary heating are sometimes employed, and the Bunsen burner when used may be differently arranged; but in the common commercial forms of lamps aid preheating-flame, of whatever description, is concentrated mainly on the center or middle section of the vaporizing-tube. The zone of greatest heat is of course at or about the center of the vaporizing-tube, and the tube becomes intensely heated at that point. Conduction through the continuous walls of the tube transfers a portion of this heat to the end in which the valve is located. By the time the central and main portion of the tube has become hot enough to vaporize oil, sufficient heat has been conducted to that portion of the tube between the valve-seat 5 and the spider 7 to cause a slight expansion lengthwise of that portion of the tube also. The valve-plunger 6, however, gets little heat by conduction through the arms of the spider 7 and is not appreciably affected in the way of expansion. Consequently the expansion of the tube carries the valve-seat 5 away from the valve-plunger and opens the valve far enough to admit a minute quantity of oil to the vaporizing-tube. This is vaporized, thereby absorbing heat from the tube and tending to prevent further expansion of the tube and any resultant too-wide opening of the valve. This and the back pressure generated by the vapor prevent any flooding of the tube with an excess of oil. The jet of vapor is of course conducted to the burner and there ignited, so that it continues to heat the vaporizing-tube after the alcohol or gas flame has been extinguished. The action of the vapor-burning apparatus thereafter becomes self-sustaining in the well-known way. The valve also has an automatic self-regulating action, any momentary increase of oil-supply to the vaporizing-tube reducing the temperature of the same slightly and causing a partial closing of the valve, thereby shutting off further access of oil until the quantity already delivered has been vaporized, when the valve will again automatically open and the regular operation continue. If the operation is not satisfactory, the screw-cap 9 can be removed and the valve adjusted by inserting a small key to grasp the end 8 of the plunger and turn the same to the right or left in order to adjust the position of the valve-plunger in its support 7, so as to reëstablish the proper relation of the parts. When the lamp is put out by closing the valve 11 and shutting off the fuel-supply, the whole vaporizing-tube 1 will contract and the part between the valve-seat 5 and the spider 7 by its contraction will bring the valve-plunger 6 down upon the valve-seat 5, closing all inlet to the vaporizing-tube.

The advantages of my invention comprise the certainty of operation, the simplicity and fewness of parts, the readiness of adjustment, and the fact that the main portion of the vaporizing-tube is not encumbered by the location therein of any apparatus whatever, the thermostatic apparatus for operating the valve being all located outside of the middle or central section of the vaporizing-tube, which is subjected to the fiercest heat both of the preheating apparatus and of the vapor-burners when under normal operation.

It is evident, of course, that various changes could be made in the details of construction illustrated without departing from the spirit and scope of my invention so long as the relative arrangement of parts and the principle of operation disclosed are preserved. Different forms of vaporizing-tube, valve-plunger, and valve-plunger support might be substituted, or other means of adjusting the valve might be employed; but all such modifications I should still consider within the limits of my invention.

Having therefore described my invention, what I claim as new, and desire to protect by Letters Patent, is—

1. The combination of the vaporizing-tube, a source of heat for preheating said tube, and the thermostatic valve-actuating apparatus located in that portion of the tube least exposed to heat during the normal operation of the preheating apparatus.

2. The combination of the vaporizing-tube provided with a valve-seat at one end, a valve-plunger, a preheating apparatus so arranged as to primarily heat the middle section of the vaporizing-tube, and a thermostic apparatus for actuating said valve-plunger which is all located outside of said central section of the vaporizing-tube.

3. The combination of the vaporizing-tube having a valve-seat in the inlet end, a valve-plunger coöperating with said valve-seat and a support for the other end of the plunger located in the vaporizing-tube near the valve-seat.

4. The combination of the vaporizing-tube having a valve-seat in the inlet end, a valve-plunger coöperating with said valve-seat and a support for the other end of the plunger located in the vaporizing-tube near the valve-seat, said support consisting of a spider screwed into the vaporizing-tube.

5. The combination of the vaporizing-tube having a valve-seat in the inlet end, a valve-plunger coöperating with said valve-seat and a support for the other end of the plunger located in the vaporizing-tube near the valve-seat, together with means for adjusting the position of the valve-plunger in said support.

6. The combination of the vaporizing-tube having a valve-seat in the inlet end, a valve-plunger coöperating with said valve-seat and a support for the other end of the plunger located in the vaporizing-tube near the valve-seat, said valve-plunger being formed of the same material as the vaporizing-tube.

Signed at New York, N. Y., this 17th day of March, 1900.

ARTHUR KITSON.

Witnesses:
W. H. PUMPHREY,
R. GERBRACHT, Jr.